United States Patent [19]
Schiowitz

[11] 3,955,847
[45] May 11, 1976

[54] WHEELCHAIR HOLD DOWN ASSEMBLY

[75] Inventor: Morton I. Schiowitz, Scarsdale, N.Y.

[73] Assignee: Medi-Cab Inc. of New York, Yonkers, N.Y.

[22] Filed: Feb. 3, 1975

[21] Appl. No.: 546,545

[52] U.S. Cl............................ 296/65 R; 105/159; 105/368 T; 105/464; 211/5; 211/7; 224/42.4; 248/119 R; 248/505; 280/179 R; 280/242 WC; 296/19; 297/379

[51] Int. Cl.².................... B60N 1/02; B60P 7/08; B61D 45/00; B62B 11/00

[58] Field of Search ............ 105/27, 159, 464, 473, 105/368 T; 214/38 A; 180/11; 211/5, 7, 8, 17; 224/42.03 B, 42.4; 248/119 R, 503, 505, 507; 280/47, 39, 179 R, 242 WC; 296/19, 65 R; 297/45, 379, 433

[56] References Cited
UNITED STATES PATENTS

| | | | |
|---|---|---|---|
| 1,258,329 | 3/1918 | Foreman | 105/27 |
| 1,541,457 | 6/1925 | Winn | 214/38 A |
| 1,581,744 | 4/1926 | Kellett | 105/159 |
| 1,716,316 | 6/1929 | Lanning | 296/65 R |
| 1,835,840 | 12/1931 | Barclay | 296/65 R |
| 2,427,161 | 9/1947 | Roe | 297/433 |
| 2,710,659 | 6/1955 | Moederle | 180/11 |
| 2,713,891 | 7/1955 | Linquist | 297/379 |
| 2,782,835 | 2/1957 | Liebich | 280/47.39 |
| 2,960,043 | 11/1960 | Clejan | 105/368 T |
| 3,591,029 | 7/1971 | Coffey | 224/42.03 B |

FOREIGN PATENTS OR APPLICATIONS 1,238,712 7/1960 France .................... 248/119 R Primary Examiner—Albert J. Makay
Assistant Examiner—Howard Beltran
Attorney, Agent, or Firm—Brooks Haidt Haffner & Delahunty

[57] ABSTRACT

A person seated in a wheelchair or other wheeled patient carrier is enabled to board a vehicle while remaining in the carrier. A hold down device secured to the vehicle floor restrains the carrier against movement regardless of acceleration or emergency braking of the vehicle, and a belt arrangement can be provided to secure the passenger in the wheeled carrier.

7 Claims, 2 Drawing Figures

WHEELCHAIR HOLD DOWN ASSEMBLY

BACKGROUND OF THE INVENTION

1. Field of the Invention

This invention relates to the vehicular transportation of people in wheelchairs and the like.

2. Discussion of the Prior Art

In the past, handicapped persons in wheelchairs have ordinarily not been able to travel on board motor vehicles while seated in their own wheelchairs. It has been necessary to assist people out of their chairs, into vehicle seats, and then back into wheelchairs after a trip is completed. If a person's own wheelchair was to be transported along with the passenger, other arrangements for carrying the chair were required. The inconvenience and even indignity of such prior art transportation has limited the freedom of handicapped people.

SUMMARY OF THE INVENTION

A hold down device for restraining an occupied wheelchair or other patient carrier having wheels against relative motion within a vehicle comprises an independent (i.e, not a part of the vehicle frame) hold down assembly including a sturdy transverse bar that is placed across lower frame structure of the wheelchair or like carrier and means for securing the bar to the vehicle floor. An upright stud passes through a central opening in the bar, and a loop or eye secured to the vehicle floor receives a hooked or return bent lower end of the stud. The upper end of the stud has means for locking the device tightly in place. Troughs or depressions in the floor, spaced on opposite sides of the chair securing arrangement, receive the chair wheels. A belt arranged to pass across the passenger is a further safety measure.

The invention is highly suitable for use in small commercially available vans which can easily be adapted to transport several persons seated comfortably in wheelchairs. This arrangement provides efficient and safe transportation for the disabled and people confined to wheelchairs whether for medical, occupational or recreational trips.

These and other features and advantages of the arrangement of the invention will be more fully understood from the following detailed description of the invention, especially when that description is read in conjunction with the accompanying drawing.

DETAILED DESCRIPTION OF A PREFERRED EMBODIMENT

Figure 1:
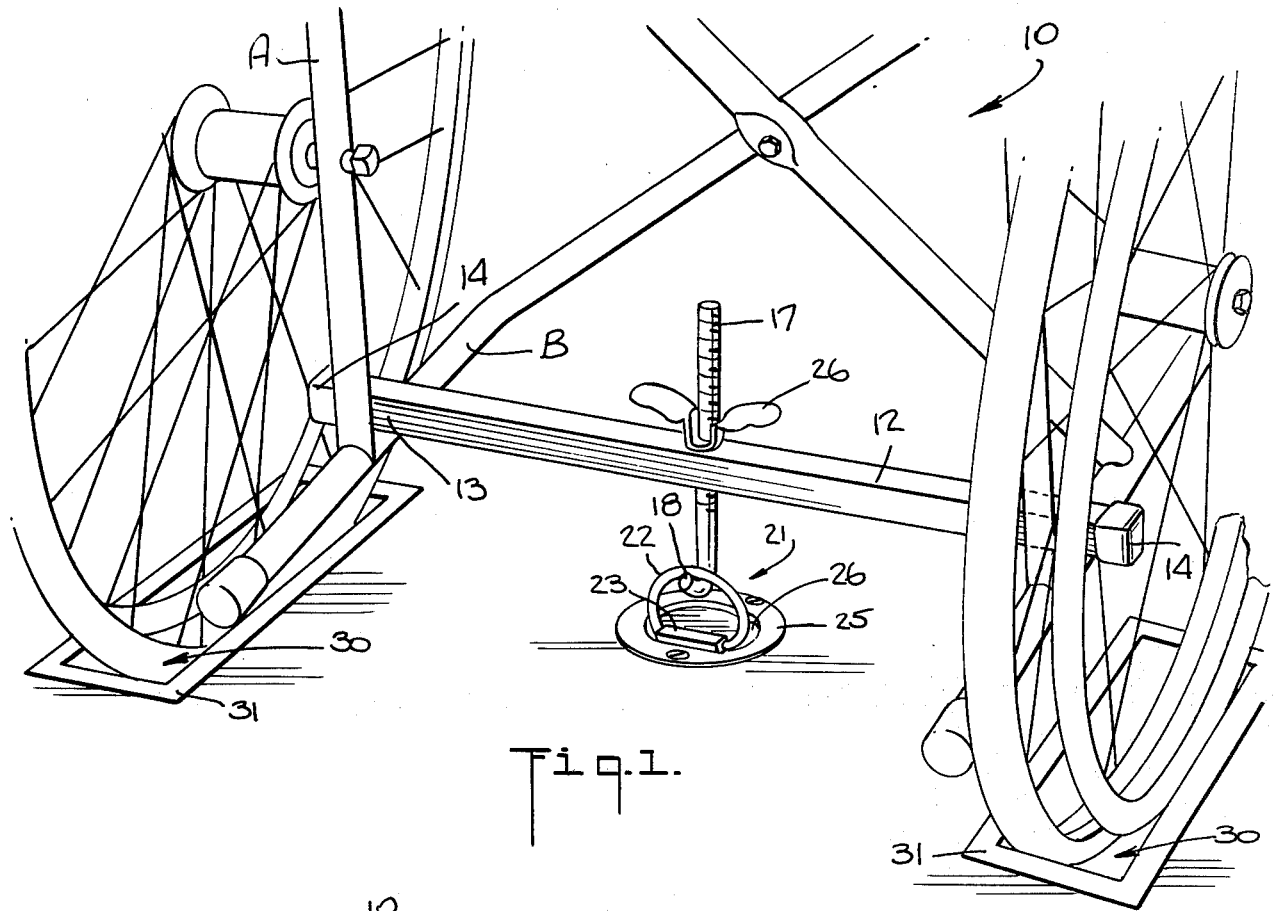
FIG. 1 is a view in perspective of a preferred embodiment of wheelchair restraining device in use.
Figure 2:
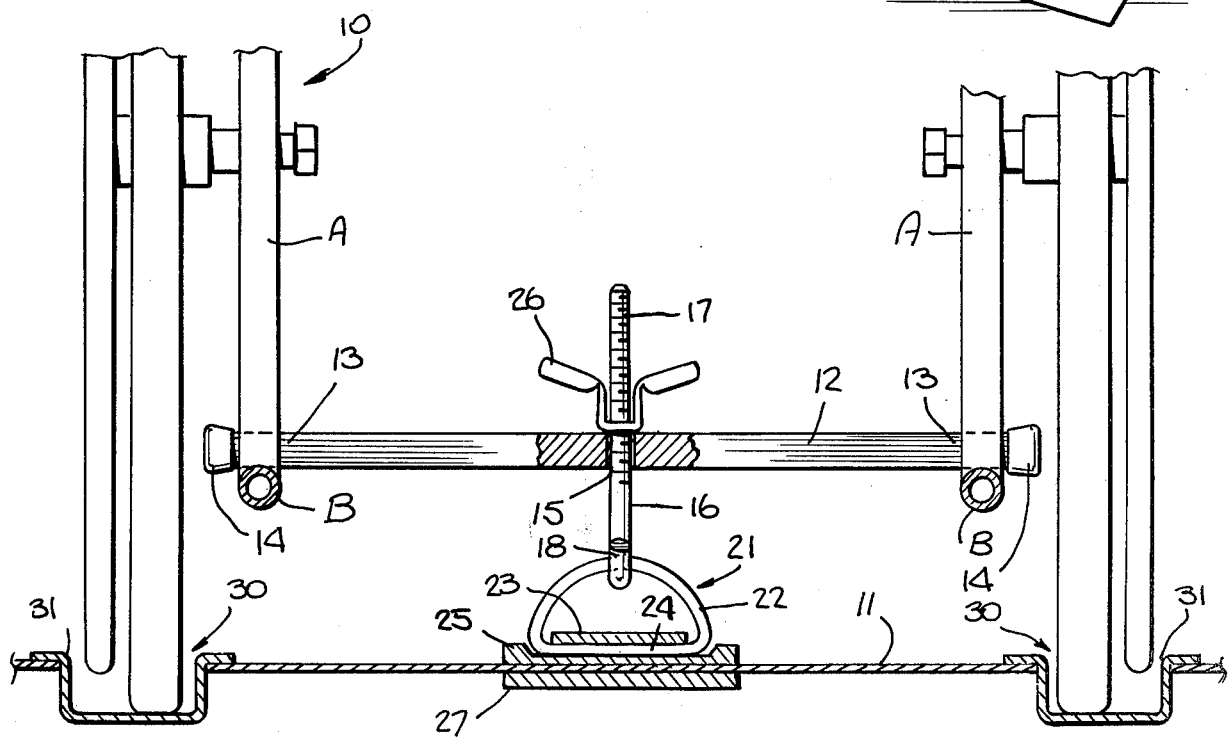
FIG. 2 is a view in section showing the relationship of the device of FIG. 1 to the vehicle floor.

In FIGS. 1 and 2 of the drawing, conventional wheelchairs 10 are shown securely located in a passenger carrying vehicle such as an automotive van having a floor 11. Although the arrangement of the invention will be described as used in such a vehicle, it should be clear that the transportation of people in wheelchairs by air, by rail or by water can also be advantageously effected in planes, trains or boats equipped with devices according to the invention.

The invention is also adaptable for use in transporting the disabled in such patient carriers as self-propelled carriages, wheeled tables, carts, etc.

The conventional wheelchair frame has at each of its sides an upwardly extending structural member A connected at the lower rear of the chair structure to a forwardly and upwardly extending frame element B so that these elements A and B join to form an angle AB of substantially 90°. Other wheeled patient carriers have analogous structure.

In accordance with the present invention a sturdy bar 12, shown as rectangular in section, and of a length somewhat greater than the distance between the frame members A and B on opposite sides of the chair, has its end portions 13 fitted into the angles AB of the chair. The end portions 13 are preferably provided with cap members 14 which locate the bar 12 and prevent damage to a chair or possible injury in handling the bar, which can be hollow for lightness of weight. The cap members 14 also prevent slippage of the bar 12.

The bar 12 itself is preferably made of steel, aluminum or some other strong structural material, and the cap members 14 can be of rubber, plastic or the like.

There is a hole 15 through the middle of the length of the bar 12, which hole, when the device is in use, extends vertically, a stud 16 having a threaded upper portion 17 and a return bend 18 at its lower end is slidably fitted through the hole 15 when the bar 12 has been placed in position.

The return bend 18 forms a hook which engages an eye or loop 21 which preferably has a generally semi-circular hook receiving portion 22 pivotally secured to a hinge member 23 by means of a straight eye part 24 which joins opposite ends of the hook receiving portion 22.

The hinge member 23, through which the part 24 of the eye 21 extends, is firmly secured to a generally discshaped plate 25 that is welded or otherwise firmly mounted flat on the vehicle floor 11. A depression 26 corresponding in contour to the portion 22 of the eye 21 permits folding down of the eye 21 to lie flush with the vehicle floor 11 when the device of the invention is not in use.

As shown in FIGS. 1 and 2, the hook and eye relationship of the parts 18 and 21 holds the bar 12 down when a butterfly nut 26 is threaded down on the stud 16. Tightening the nut 26 in place pulls the bar 12 down tightly into the angles AB and firmly holds the chair 10 in place. It would be possible, if desired, to reverse the hook and eye parts, or to provide some other kind of locking mechanism instead of the nut and thread illustrated, but a preferred embodiment is shown.

Referring now to FIG. 2, it will be seen that the floor 11 of the vehicle can be reinforced at the location of the plate 25 by another plate 27 welded on below the floor 11 at the location of the plate 25.

The eye or loop 21 is oriented in use in the same vertical plane as the bar 12 and thus provides some resistance to turning of the chair 10 as well as restraint against linear movement. To further secure the chair, a pair of spaced depressions 30 are provided in the vehicle floor 11 to receive the wheels of the chair. These depressions can be formed by cutting out rectangular portions of the floor 11 and welding or otherwise attaching generally trough-like members 31 into the rectangular holes so made. These trough-like members 31 should have a width in the lengthwise direction of the bar 12 that is great enough to accommodate wheelchairs having differently spaced wheels.

Thus, when an occupied wheelchair or other patient carrier having wheels is brought into the vehicle, for example by rolling the chair up a ramp, the wheels are first guided into the trough-like members 31, which should have smoothly curved lower surfaces, and then the bar 12 is put into position, the stud 16 is hooked through the loop 21, and the nut 26 is threaded down to a tight grip on the rod 12. The chair 10 cannot move. To accommodate variations in wheel spacing, the interiors of the members 31 can be wider than the wheels they are to receive, say 2 to 3 inches wide.

As a further safety measure, a belt not shown in the drawing, can be arranged to cross from side to side across the passenger and around the chair 10. The passenger cannot then be forced forward from his chair in a sudden stop or collision.

The device of the invention will ordinarily be so arranged that passengers can face forward for comfort, and side by side chair arrangements can be set up for ease of conversation between passengers. But two passengers or rows of passengers could face each other if desired.

As mentioned above, the arrangement shown is highly effective in a small van or bus, but is also applicable to a railroad car, airplane or other vehicle. A similar arrangement might be employed in a passenger elevator.

In one modified form of the invention, a clamp could replace the nut 26. Another possibility is the reversal of the hook 18 and the eye 21, but this is not ordinarily as advantageous as the arrangement shown.

Various other modifications, adaptations and changes in materials employed will suggest themselves to those familiar with the art, and are considered to be within the spirit and scope of the invention.

What is claimed is:

1. An arrangement for safely securing a wheeled patient carrier such as a wheelchair against relative motion within a vehicle having an independent hold down assembly, comprising an independent bar member for normally horizontally engaging spaced side frame structure of a wheeled patient carrier at opposite end portions of said bar member, a stud member arranged substantially along the perpendicular bisector of said bar member, a hook element formed by a bent lower part of said stud member and an eye element cooperating with said hook element wherein said eye element is adapted to be secured permanently to a vehicle floor and said bar and stud members are portable, and means for locking said stud member in a restraining position.

2. The arrangement of claim 1, wherein the eye element is pivotally mounted on a plate for attachment to a vehicle floor.

3. The arrangement of claim 1 and including cap members at opposite ends of said bar member.

4. The arrangement of claim 1 wherein said stud member has a threaded upper part, and a nut on said upper part is arranged to be tightened downwardly against said bar member.

5. In combination, a vehicle and an occupied wheeled patient carrier carried within the vehicle, a floor of said vehicle having a pair of trough-like members receiving the lower parts of wheels of said patient carrier, an independent bar extending horizontally between frame structure of opposite sides of said patient carrier, and means for releasably and removably locking said bar in restrained position to an eye in the vehicle floor.

6. The arrangement of claim 5 wherein the locking means includes a portable and removable stud passing through a center part of said bar, a locking member fitted on the upper part of said stud, and a hook formed at the lower part of said stud engaging said eye secured to the vehicle floor.

7. A device for securing a wheeled patient carrier having transverse spaced wheels and frame members such as a wheelchair to a vehicle floor comprising an independent elongated bar having a length greater than the distance between said wheels and frame members of a wheeled patient carrier to be secured, means defining a hole extending perpendicularly through the center of said bar, a stud having threads at one end portion and a return bend at its opposite end portion, said stud passing through said hole, a nut threaded on the threads of said stud, and a loop for engaging said return bend, said bar and stud being portable and said loop being adapted for permanent attachment to a vehicle floor.

* * * * *